(12) United States Patent
Le Gac Cesbron et al.

(10) Patent No.: US 12,353,851 B2
(45) Date of Patent: Jul. 8, 2025

(54) GENERATOR AND METHOD FOR GENERATING SECOND PROCESSING OPERATIONS, AND SERVICE PROVISION DEVICE USING SAME

(71) Applicant: Orange, Issy-les-Moulineaux (FR)

(72) Inventors: Sylvie Le Gac Cesbron, Chatillon (FR); Thierry Martinez, Chatillon (FR); Sébastien Chevallier, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 359 days.

(21) Appl. No.: 17/851,649

(22) Filed: Jun. 28, 2022

(65) Prior Publication Data

US 2022/0414200 A1 Dec. 29, 2022

(30) Foreign Application Priority Data

Jun. 29, 2021 (FR) ...................................... 2106962

(51) Int. Cl.
*G06F 8/34* (2018.01)
(52) U.S. Cl.
CPC ...................................... *G06F 8/34* (2013.01)
(58) Field of Classification Search
None
See application file for complete search history.

(56) References Cited

U.S. PATENT DOCUMENTS

| | | | |
|---|---|---|---|
| 10,416,996 B1* | 9/2019 | Samprathi | G06F 9/541 |
| 2016/0217360 A1* | 7/2016 | Zeng | G06Q 10/109 |
| 2017/0315782 A1* | 11/2017 | Chaudhry | G06F 9/4881 |
| 2017/0316355 A1* | 11/2017 | Shrestha | G06Q 10/067 |
| 2021/0342329 A1* | 11/2021 | Padmanabhan | G06F 16/28 |

FOREIGN PATENT DOCUMENTS

WO 2017189638 A1 11/2017

OTHER PUBLICATIONS

French Search Report and Written Opinion dated Feb. 28, 2022, for corresponding French Application No. 2106962, filed Jun. 29, 2021.

(Continued)

*Primary Examiner* — Marina Lee
(74) *Attorney, Agent, or Firm* — David D. Brush; Westman, Champlin & Koehler, P.A.

(57) ABSTRACT

A generator of second processing operations providing second services, the second processing operation including at least one command for an electronic device. The command triggers an action from the electronic device from among the following actions: execution of a step of a method for a first processing operation providing a first service, and controlling the electronic device. The generator generates commands as a function of multiple first cards and of multiple second cards selected from among a set of first cards and a set of second cards, respectively, each first card being associated with a logic connector able to be executed during the execution of a second processing operation and each second card being associated with one element from among the following elements: a first service and an electronic device connected to a controller able to implement the second processing operation.

15 Claims, 5 Drawing Sheets

(56) References Cited

OTHER PUBLICATIONS

Cappiello Cinzia et al., "Enabling End User Development through Mashups: Requirements, Abstractions and Innovation Toolkits", Jun. 7, 2011 (Jun. 7, 2011), Advances in Biometrics : International Conference, ICB 2007, Seoul, Korea, Aug. 27-29, 2007; XP047373751.
English Translation of Written Opinion dated Feb. 28, 2022, for corresponding French Application No. 2106962, filed Jun. 29, 2021.

\* cited by examiner

GENERATOR AND METHOD FOR GENERATING SECOND PROCESSING OPERATIONS, AND SERVICE PROVISION DEVICE USING SAME

TECHNICAL FIELD

The invention relates to the generation of new services, in particular of second processing operations providing second services based on existing first services and/or connected things.

PRIOR ART

Originally, service generation or composition, also called "mashup", referred to combining data and/or processing operations from multiple sources, such as websites, applications, etc. making it possible to create any entirely new service from the collected elements. More broadly, service generation refers to the possibility of mixing and chaining together multiple actions to arrive at a new service.

More recently, service generation has found a favorable ecosystem in the development of application programming interfaces, or APIs, and with a view to being able to interconnect services. For the user, there is, from a practical point of view, a saving in efficiency and time afforded by chaining together and automating actions arising from different services and applications.

In the B2B (business-to-business) market, this capability is either provided as is or integrated into business offerings, in particular software suites, such as Cisco Spark. The programming interfaces are then designed for advanced users. Possible "mashups" address business process applications, information and data management applications and, more recently, applications linked to connected things.

In the B2C (business-to-consumer) market, the best-known player is still IFTTT™, which is a web service allowing its users to create sequences of instructions based on a catalog of APIs, although large equipment manufacturers have since integrated similar orchestration functions into their applications. While the solution provided by IFTTT is relatively simple to use, its target nonetheless remains users with an experienced technophile profile, because the users have to have knowledge of this type of functionality.

With the emergence of connected things, and more particularly of connected things for the smart home, service composition integrated into applications for managing their connected things and equipments is also available to the user. For example, Apple provides a Home™ app programming interface for creating automation scenarios for connected home-automation equipments. More recently, Samsung has provided a SmartThings™ application affording the possibility, by virtue of personalized automation, of creating events and scenarios.

However, all of these programming interfaces provide for creating scenarios by means of textual or visual lists. Now, list creation in itself, and the integration of elements into the list, are not necessarily easy to learn for novice users. In addition, their complexity leaves room, even for experienced users, for the risk of composition errors leading to automation errors in the implementation of the new service thus composed.

SUMMARY OF THE INVENTION

One of the aims of the present invention is to provide improvements with respect to the prior art.

One subject of the invention is a generator of second processing operations providing second services, the second processing operation comprising at least one command for an electronic device, the command triggering an action from the electronic device from among the following actions:
  execution of a step of a method for a first processing operation providing a first service,
  control of the electronic device,
  the generator of second processing operations comprising a generator of commands as a function of multiple first cards and of multiple second cards selected independently from among a set of first cards and a set of second cards, respectively, each first card being associated with a logic connector able to be executed during the execution of a second processing operation and each second card being associated with one element from among the following elements: a first service and an electronic device connected to a controller able to implement the second processing operation.

Thus, the generation of the second processing operation is simplified through the use of selected cards, the risk of a command error is reduced and more complex second processing operations may be generated.

Advantageously, the generator of second processing operations comprises a user interface, the user interface being able to display the set of first cards and the set of second cards, being able to receive an instruction for selecting first cards and second cards as a function of an action from a user.

Thus, the selection of cards is facilitated, reducing erroneous commands: commands for the wrong parameters, commands for the wrong connected thing, commands for the wrong service, etc. or the erroneous triggering of commands: triggering the wrong commands or triggering under inappropriate conditions.

Advantageously, the command generator generates at least one command as a function of an order in which the selected first cards and second cards are positioned.

Advantageously, the user interface comprises a receiver of an instruction for scheduling the selected first cards and second cards.

Advantageously, the user interface comprises at least one first region for displaying a portion of the selected first cards and second cards and a second region for displaying the rest of the selected first cards and second cards, the first display region being associated with a trigger and the second display region with a controller activated by the trigger.

Advantageously, the first cards and second cards are virtual cards available in a card base.

Advantageously, the first cards and second cards are physical cards and the generator of second processing operations is connected to an identifier of the selected first and second cards.

Advantageously, the generator of second processing operations comprises a position analyzer for analyzing the position of the cards which is connected to a card sensor, the analyzer being able to provide the order of the selected first cards and second cards.

Another subject of the invention is a service provision device comprising:
  a processing operation base comprising at least first processing operations;

a processor able to implement at least one first processing operation;

characterized in that the service provision device further comprises:

a generator of second processing operations providing second services, the second processing operation comprising at least one command for an electronic device, the command triggering an action from the electronic device from among the following actions:

execution of a step of a method for a first processing operation providing a first service, control of the electronic device, the generator of second processing operations comprising a generator of commands as a function of multiple first cards and of multiple second cards selected independently from among a set of first cards and a set of second cards, respectively, each first card being associated with a logic connector able to be executed during the execution of a second processing operation and each second card being associated with one element from among the following elements: a first service and an electronic device connected to a controller able to implement the second processing operation, the generated second processing operation being able to be implemented by the processor.

Advantageously, the service provision device comprises a recorder able to store the generated second processing operation in the processing operation base.

Another subject of the invention is a method for generating a second processing operation providing second services, the second processing operation comprising at least one command for an electronic device, the command triggering an action from the electronic device from among the following actions:

execution of a step of a method for a first processing operation providing a first service, control of the electronic device, the generation of second processing operations comprising the generation of commands as a function of multiple first cards and of multiple second cards selected independently from among a set of first cards and a set of second cards, respectively, each first card being associated with a logic connector able to be executed during the execution of a second processing operation and each second card being associated with one element from among the following elements: a first service and an electronic device connected to a controller able to implement the second processing operation.

Thus, the generation of the second processing operation is simplified through the use of selected cards, the risk of a command error is reduced and more complex second processing operations may be generated. What is meant by the second processing operation being more complex is a succession of a larger number of commands and/or with more complex command triggering, i.e. triggering comprising a larger number of triggering conditions and/or greater nesting of triggering conditions.

Advantageously, the generation of second processing operations comprises multiple selections of first cards from among the set of first cards and, independently of the selections of first cards, multiple selections of second cards from among the set of second cards, a selection being a function of at least one selection instruction.

Advantageously, the generation of second processing operations comprises scheduling of the selected first cards and second cards as a function of at least one scheduling instruction.

Advantageously, the instruction is a function of an action from a user.

Advantageously, the generating method comprises displaying, by means of a user interface, a first region for displaying a portion of the independently selected first cards and second cards and a second region for displaying the rest of the independently selected first cards and second cards, the first display region being associated with a trigger and the second display region with a controller activated by the trigger.

Advantageously, according to one implementation of the invention, the various steps of the method according to the invention are implemented by software or a computer program, this software comprising software instructions intended to be executed by a data processor of a device forming part of a processing operation generator or of a service provision device and being designed to command the execution of the various steps of this method.

The invention therefore also targets a program comprising program code instructions for executing the steps of the method for generating second processing operations when said program is executed by a processor.

This program may use any programming language, and be in the form of source code, object code, or intermediate code between source code and object code, such as in a partially compiled form, or in any other desirable form.

BRIEF DESCRIPTION OF THE DRAWINGS

The features and advantages of the invention will become more clearly apparent upon reading the description, given by way of example, and the related figures, in which.

DESCRIPTION OF THE EMBODIMENTS

Figure 1:
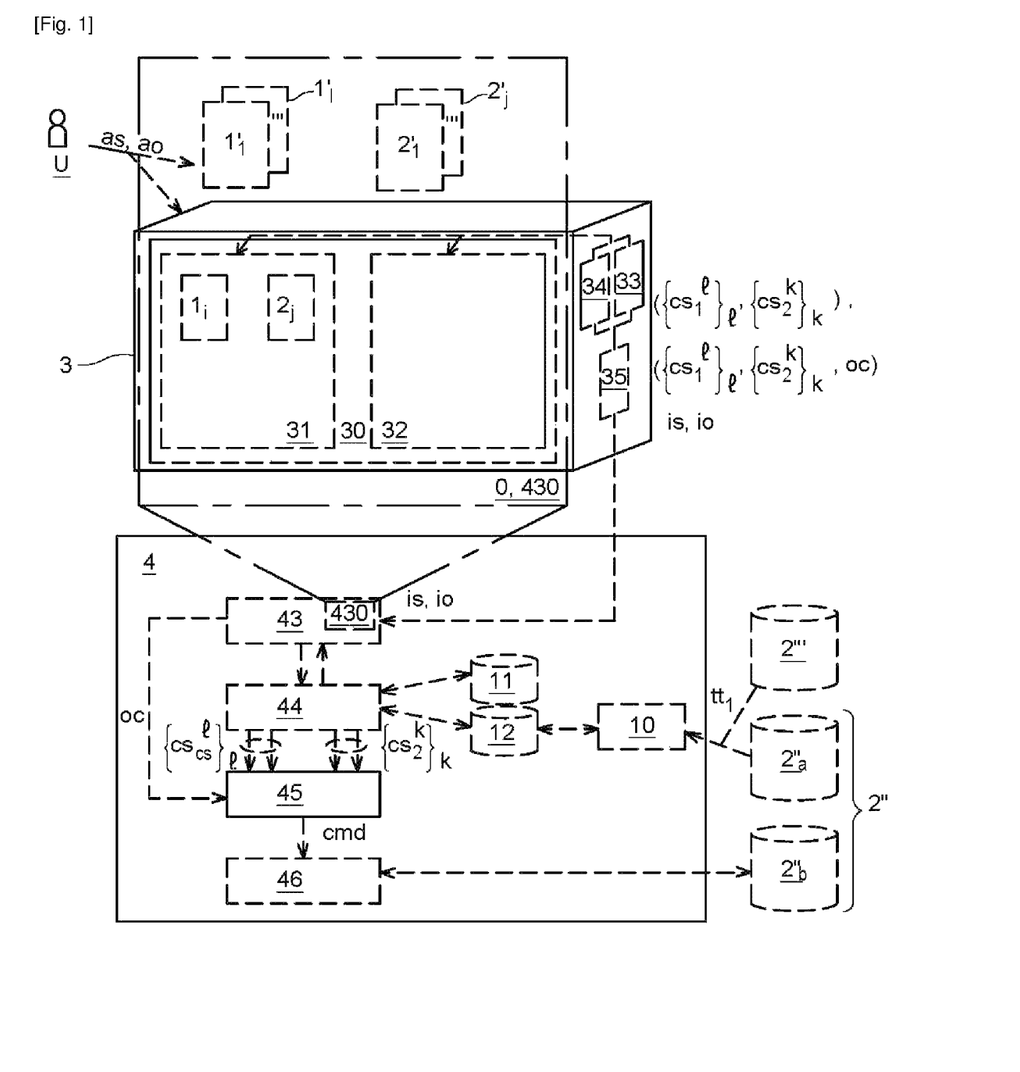
FIG. 1 shows a simplified diagram of a generator of second processing operations according to the invention.

FIG. 1 illustrates a simplified diagram of a generator of second processing operations according to the invention.

The second processing operations tt2 provide second services. A second processing operation tt2 comprises at least one command cmd for an electronic device 9, the command cmd triggering an action from the electronic device 9 from among the following actions:
- execution of a step of a method for a first processing operation tt1 providing a first service,
- control of the electronic device.

The generator of second processing operations 4 comprises a generator 45 of commands as a function of multiple first cards $\{cs_1^I\}_I$ and of multiple second cards $\{cs_2^k\}_k$ selected independently from among a set of first cards $\{C_1^i\}_i$ and a set of second cards $\{c_2^j\}_j$, respectively, each first card being associated with a logic connector able to be executed during the execution of a second processing operation and each second card being associated with one element from among the following elements: a first service and an electronic device connected to a controller able to implement the second processing operation tt2.

In particular, the second cards are associated with a value of a parameter that may be associated with a first service or an electronic device.

In particular, the generator of second processing operations 4 comprises a user interface 43 able to receive an instruction is for selecting first cards and second cards as a function of an action as from a user U. A selection instruction is indicates a selected first or second card whichever the first and/or second previously selected. Thus, the first and second are selected independently. The user interface 43 is able to display the set of first cards $\{C_1^i\}_i$ and the set of second cards $\{c_2^j\}_j$.

In particular, the command generator 45 generates at least one command cmd as a function of an order io in which the selected first cards and second cards are positioned.

In particular, the user interface 43 is able to receive an instruction for scheduling io the selected first cards and second cards.

Potentially, the scheduling instruction is a position instruction associated with a card selection instruction. For example, the selection instruction is comprises a list of identifiers of selected cards and potentially the scheduling instruction is a list of positions of the selected cards. Thus, the selected card corresponding to the nth identifier on the list will be associated with the nth position on the list of positions.

In one alternative embodiment, the selection instructions and scheduling instructions are paired, the user interface then providing instruction pairs, each pair corresponding to a selected card and comprising an identifier and a position of the selected card.

In particular, the user interface 43 comprises at least one first display region 31 for displaying a portion of the selected first cards and second cards and a second display region 32 for displaying the rest of the selected first cards and second cards, the first display region 31 being associated with a trigger and the second display region 32 with a controller 58 activated by the trigger.

In particular, the first cards and second cards are virtual cards available in a card base 11, 12.

In particular:
- the first cards and second cards are physical cards; and
- the generator of second processing operations 43 is connected to an identifier 33 of the selected first and second cards.

In particular, the generator of second processing operations 43 comprises a position analyzer 34 for analyzing the position of the cards which is connected to a card sensor 33, the analyzer 34 being able to provide the order io of the selected first cards and second cards.

In particular, prior to the use of the command generator 45, first and second cards are generated. The first cards are associated with logic connectors, for example "if", "or if", "then", "then after", "or", "and", "else", etc. The second cards are associated with actions from among the following:
- execution of a step of a method for a first processing operation providing a first service,
- control of an electronic device, in particular of a connected equipment, such as a connected thing (one or more bulbs, speakers, etc.), home-automation equipment (shutter, door, window, automatic watering, alarms, etc.), etc.

In particular, the logic connectors associated with first cards are stored in a connector base 2′″, and the actions associated with second cards are stored in one or more action bases 2″, 2″a, 2″b, in particular in a base comprising both first processing operations and control interfaces for electronic devices 2″a or specific bases (not illustrated) comprising first processing operations or control interfaces for electronic devices, respectively.

It should be noted that a second processing operation generated at a time t0 by the generator of second processing operations 4 and stored in a second processing operation base 2″b may become, at a later time t1=t0+T(T>0), for the generator of second processing operations, a first processing operation from which a second card will be able to be generated (in particular in real time, when the cards are virtual cards, i.e. as soon as the second processing operation has been recorded at time t0, and used to generate a new second processing operation.

In particular, the first cards and second cards thus generated are recorded in at least one storage device such as a database, for example a card base, or a first card base 11 and a second card base 12, respectively.

In particular, a card generator 10 generates the first and/or the second cards and records them in a storage device 11, 12. Potentially, the generator of second processing operations comprises the card generator 10 and, in particular, the storage device for storing the generated cards 11, 12.

When the first and second cards are physical cards $1_1$ . . . $1_I$ and $2_1$ . . . $2_J$, respectively, the card generator 10 associates, with at least one identifier of the physical first card or of the physical second card, respectively, logic connectors, for example "if", "or if", "then", "then after", "or", "and", "else", etc., and actions from among the following:
- execution of a step of a method for a first processing operation providing a first service,
- control of an electronic device, in particular of a connected equipment, such as a connected thing (one or more bulbs, speakers, etc.), a home-automation equipment (shutter, door, window, automatic watering, alarms, etc.), etc.

The user U performs an action as to select first cards and second cards, whether virtual or physical.

In the case of physical cards, the selected cards are arranged on a flat surface 30, for example the screen of a communication terminal, an electronic board 3 or a straightforward table 0. A card identifier 33 is able to detect the selected cards:
- either because the selected cards comprise an electronic identifier: RFID chip, NFC chip, etc. In this case, the identifier comprises an electronic reader, for example an RFID, NFC, etc. reader or because there is printed either directly on the selected cards, or on a tag affixed to these selected cards, an identifier such as a barcode or more simply an image or a text (word or set of words) associated with the connector, with the first service provided by the first processing operation, or with the electronic device, respectively. In this case, the identifier 33 comprises a camera which captures the identifier and an analyzer able to determine the connector, the first processing operation, the electronic device associated with the card and, where applicable, to be recognized prior to this determining operation, the printed image or text.

In particular, either the generator of second processing operations 4 or the communication terminal 3 (either connected or comprising the generator of second processing operations 4) comprises the identifier 33.

In the case of virtual cards, the user performs the selection action as on a communication terminal 3 (either connected or comprising the generator of second processing operations 4).

In particular, the user U schedules ao the selected cards. For example, they arrange in order (either from left to right or from top to bottom, etc.) a first card associated with a first connector, a second card associated, in particular, with a first connected thing, another first card associated with a second connector and another second card associated, in particular, with a first service. In particular, the direction of reading of the cards by the position analyzer 34 is pre-established.

In particular, the user U arranges the first and second cards in two distinct regions 31 and 32 of a region 30, the first region 31 is associated with a trigger and the second region 32 is associated with a controller. In the case of a screen or an electronic board 30 on which the physical cards are arranged or, respectively, of a screen 30 of a communication terminal 3 connected to the generator of second processing operations 4 or of a user interface 430 for a generator of second processing operations 430 on which the selected virtual cards are displayed, the screen or board 30 is divided into two regions 31, 32 called, in particular, display regions in the case of the screen 30. In the case of a straightforward table 0, the selection region 30 in which the selected cards are arranged is then divided into two regions 31, 32.

In the above example, they arrange, in the first region 31, a first card associated with a first connector, an associated second card and, in the second region 32, another first card associated with a second connector and another second card associated, in particular, with a first service. Potentially, they arrange them in an ordered manner in each of the two regions.

In the case of two regions, the position analyzer 34 is not only able to detect the order in which the selected cards are arranged but also in which region they are positioned.

When the identifier 33 or the position analyzer 34, respectively, are not implemented in the generator of second processing operations 4 but in a distinct device 3, such as a communication terminal or an electronic board, the distinct device 3 comprises a transmitter 35 able to send the generator of second processing operations the identifiers of the first cards and second cards identified by the identifier 33 and, where applicable, their positions/orders determined by the position analyzer 34, in particular in the form of a selection instruction is or a scheduling instruction io, respectively.

In the case of virtual cards, the transmitter 35 is potentially able to receive, from the user interface 43, multimedia data representing the virtual cards able to be reproduced by the screen 30 and, potentially, multimedia data representing the first region 31 and the second region 32.

In particular, the generator of second processing operations 4 comprises the selector 44 which is able to retrieve, from the one or more card bases 11, 12, the first cards and second cards selected as a function of the selection instruction is provided by the user interface 430, in particular by the identifier 33, and transmit them to the command generator 45.

Potentially, in the case of virtual cards, the selector 44 delivers multimedia data representing the selected virtual cards to the user interface which triggers the reproduction of the selected cards on the screen 30.

In particular, the user interface further provides the command generator 45 with the order of the selected cards oc.

The command generator 45 produces, as a function of the received data: selected cards and, where applicable, order of the cards, at least one command or a series of commands.

In the case where the order of the cards comprises the association of a portion of the selected cards with a first region and the association of the rest of the selected cards with a second region, the command cmd generated by the command generator 45 comprises a triggering command intended to be executed by a trigger and a control command intended to be implemented by a controller, a processing operation processor executing the second processing operation comprising the trigger and the controller. The trigger is able to trigger the execution of the control command by the controller as a function of the result of the execution of the triggering command.

In particular, the generator of second processing operations 4 comprises a second processing operation recorder 46 which makes it possible to write the second processing operation to a storage device, in particular a processing operation base 2" or even a second processing operation base 2"b.

Figure 2:
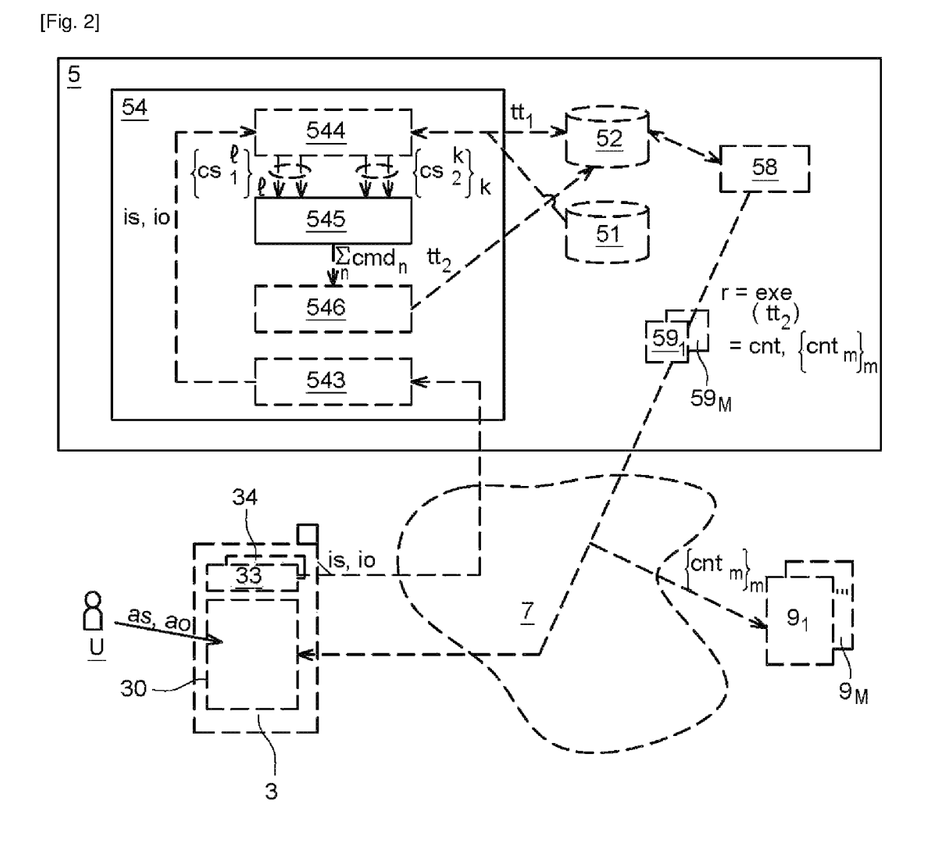
FIG. 2 shows a simplified diagram of a service provision device according to the invention.

FIG. 2 illustrates a simplified diagram of a service provision device according to the invention.

The service provision device 5 comprises:
a processing operation base 52" comprising at least first processing operations tt1;
a processor 58 able to implement at least one first processing operation;
a generator 54 of second processing operations tt2 providing second services, the second processing operation tt2 comprising at least one command cmd for an electronic device 5, $9_1 \ldots 9_M$, the command cmd triggering an action from the electronic device 5, $9_1 \ldots 9_M$ from among the following actions:
execution of a step of a method for a first processing operation tt1 providing a first service,
control of the electronic device 5, $9_1 \ldots 9_M$.

The generator 54 of second processing operations comprises a generator 545 of commands as a function of multiple first cards $\{cs_1^I\}_I$ and of multiple second cards $\{cs_2^k\}_k$ selected independently from among a set of first cards $\{c_1^i\}_i$ and a set of second cards $\{c_2^j\}_j$, respectively, each first card being associated with a logic connector able to be executed during the execution of a second processing operation and each second card being associated with one element from among the following elements: a first service and an electronic device $9_1 \ldots 9_M$ connected to a controller able to implement the second processing operation tt2.

In particular, the service provision device 5 comprises a recorder 545 able to store the generated second processing operation tt2 in the processing operation base, in particular a second processing operation base 52.

In particular, the generator 54 of second processing operations comprises a selector 544 of first cards, in particular from a first card base (not illustrated), and of second cards, in particular from a second card base (not illustrated).

The second card base is, in particular, previously established on the basis of the first processing operations in the processing operation base, in particular a first processing operation tt1 base and, potentially, second processing operations that have already been generated and recorded in a second processing operation base tt2 which become, for the second processing operation being generated, first processing operations.

The selector 544 provides the command generator 545 with the selected first cards and second cards $\{cs_1^r\}_r$, $\{cs_2^k\}_k$.

In particular, in the case where the service provision device 5 is connected to a communication terminal 3 by means of which the user U selects the cards, the service provision device 5 and/or the generator of second processing operations 5 comprises a user interface 545 which receives a selection instruction is and, where applicable, a scheduling instruction io.

In particular, the communication terminal 3 comprises a screen 30 on which the cards are displayed when they are virtual, the screen 30 being, in particular, a touchscreen allowing the user to perform a selection as or scheduling ao action directly on the displayed cards.

In particular, the communication terminal 3 comprises an identifier 33 for identifying selected cards as a function of the selected cards as on the screen 30 or physical cards positioned on the terminal or on a flat surface. The identifier 33 delivers selection instructions is to the selector 544 in particular via the user interface 543.

In particular, the communication terminal 3 comprises a position analyzer 34 for analyzing the position of selected cards as a function of the selected cards as on the screen 30 or physical cards positioned on the terminal or on a flat surface. The position analyzer 34 delivers scheduling instructions io to the command generator 545, in particular via the user interface 543.

The command generator 545 then generates at least one command cmd, or even a series of commands $\Sigma_n cmd_n$ as a function of the selected cards $\{cs_1^r\}_r$, $\{cs_2^k\}_k$ and, where applicable, the scheduling instruction io (potentially each position of the scheduling instruction is coupled to a selected card and provided by the selector 544).

In particular, the user U may request, by the means of the communication terminal 3, the execution of the second processing operation tt2 thus generated by the service provision device 5.

The service provision device 5 comprises in particular a processor 58 that is able to execute the one or more commands of the second processing operation and, where applicable, read these commands from the processing operation base 52.

In particular, the service provision device 5 comprises at least one controller $59_1 \ldots 59_M$ for at least one electronic device $9_1 \ldots 9_M$ connected to the service provision device 5. Thus, when the second processing operation tt2 comprises electronic device control commands, the processor 58 is able to trigger at least one controller $59_1 \ldots 59_M$ which sends a control signal cnt, $\{cnt_m\}_m$ to at least one electronic device $9_1 \ldots 9_M$. In particular, the control signal is a function of the execution of the processing operation by the processor 58 r=exe(tt2).

In particular, the processor 58 consists of or comprises a trigger for a controller $59_1 \ldots 59_M$. In particular, the trigger 58 triggers a controller $59_1 \ldots 59_M$ as a function of the result of the execution of the processing operation by the processor 58 r=exe(tt2).

In particular, the communication terminal 3 is connected to the service provision device 5 via a communication network 7.

In particular, the service provision device 5 is connected to at least one electronic device $9_1 \ldots 9_M$ either directly or via a communication network which might or might not be the same as the communication network connecting the communication terminal 3 to the service provision device 5.

Figure 3:
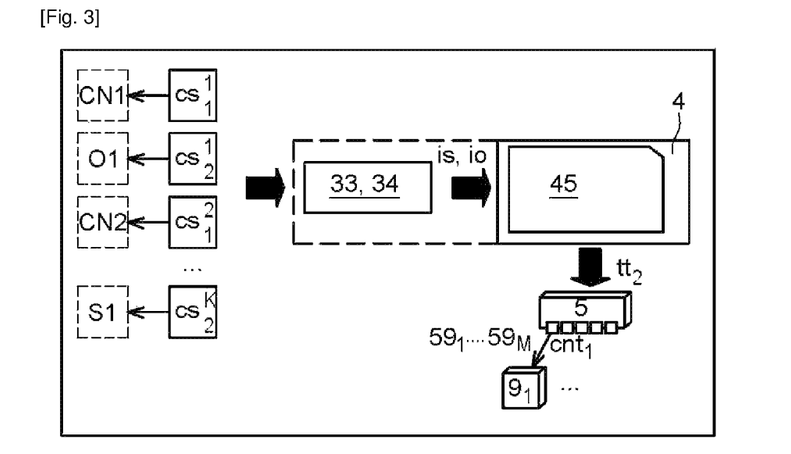
FIG. 3 shows a simplified diagram of architecture implementing a generator of second processing operations according to the invention.

FIG. 3 illustrates a simplified diagram of an architecture implementing a generator of second processing operations according to the invention.

The generator of second processing operations 4 comprises a command generator able to generate at least one command as a function of the selected first cards $cs_1^1$, $cs_1^2 \ldots$ and second cards $cs_2^1 \ldots cs_2^k$.

The selected first cards $cs_1^1$, $cs_1^2 \ldots$ are associated with connectors CN1, CN2, and the selected second cards $cs_2^1 \ldots cs_2^k$ are associated with electronic devices, such as connected things from the Internet of Things, O1, or first services S1.

In particular, the at least one command generated by the command generator 45 is provided in the form of a set of instructions, for example by means of a source code such as the following source code:

```
IF <object 1><condition 1>
   AND <object 2><condition 2>
THEN <object 3><action 3>
   AND <object 4><action 4>
```

In particular, a selected card identifier 33 and, potentially, a position analyzer 34 for analyzing the position of selected cards transmits selection instructions is and, where applicable, scheduling instructions io to the generator of second processing operations 4 as a function of selection as and, where applicable, scheduling ao actions from the user on the first cards and second cards.

In particular, the generator of second processing operations 4 comprises the selected card identifier 33 and, potentially, a position analyzer 34.

In particular, a device for managing connected things 5, for example an Internet-of-Things (IoT) platform, executes the second processing operation thus generated tt2. The device for managing connected things 5 controls, as a function of the execution of the second processing operation tt2, at least one electronic device $9_1$, such as a connected thing.

In particular, the device for managing connected things 5 comprises control interfaces for electronic devices $59_1 \ldots 59_M$. The control interface $59_1$ or controller controls the connected thing $9_1$ as a function of the result of the execution, by the management device 5, of the generated second processing operation tt2. In particular, the control interface $59_1$ is triggered by the management device 5 as a function of the execution of the second processing operation tt2.

In the case of virtual cards, a user manipulates, on a graphical interface 30, a set of virtual cards comprising a set of first cards and a set of second cards. Potentially, they adjust the position of the selected cards in relation to one another. The selected first and second cards allow the command generator 45 to determine, as a function of the logic connectors, associated electronic devices or first services, respectively, and, where applicable, as a function of their positions with respect to one another, a second processing operation in particular in the form of a "mashup" or scenario.

The first cards and second cards are modeled beforehand, potentially by means of a computer program.

In particular, after each card movement, the placed cards are analyzed by a selected card identifier 33 and, potentially, a position analyzer 34.

In particular, a concordance analyzer is able to check the concordance between a location and the card desired to be placed there. For example, when the screen is divided into two regions, with a first region associated with a trigger and a second region associated with a controller, the concordance analyzer checks whether the first card positioned in the first region is associated with a condition logic connector, such as IF, OR IF, etc., or if the first card positioned in the second region is associated with an action logic connector, such as THEN, THEN AFTER, ELSE, etc. Potentially, the selected card identifier 33 and, where applicable, the position analyzer 34 supply the concordance analyzer with the identifiers of selected cards and, where applicable, their positions.

Potentially, the selected card identifier 33 and, where applicable, the position analyzer 34 deliver the identifiers of selected cards and, where applicable, their positions to the generator of second processing operations 4 which calculates and produces a second processing operation consisting of one or more commands or sequences of commands to be implemented in order to execute the second processing operation, i.e. to test the conditions and execute the actions if the conditions are met.

In particular, the second processing operation tt2 is executed by the IoT platform 5 equipped with connectors $59_1 \ldots 59_M$ which is able to interrogate and actuate/control the connected things $9_1 \ldots$ . For example, the conditions provided by the second processing operation tt2 are checked by interrogating one or more connected things and the controller commands the implementation of an action predefined by the second processing operation if the condition is met.

Figure 4:
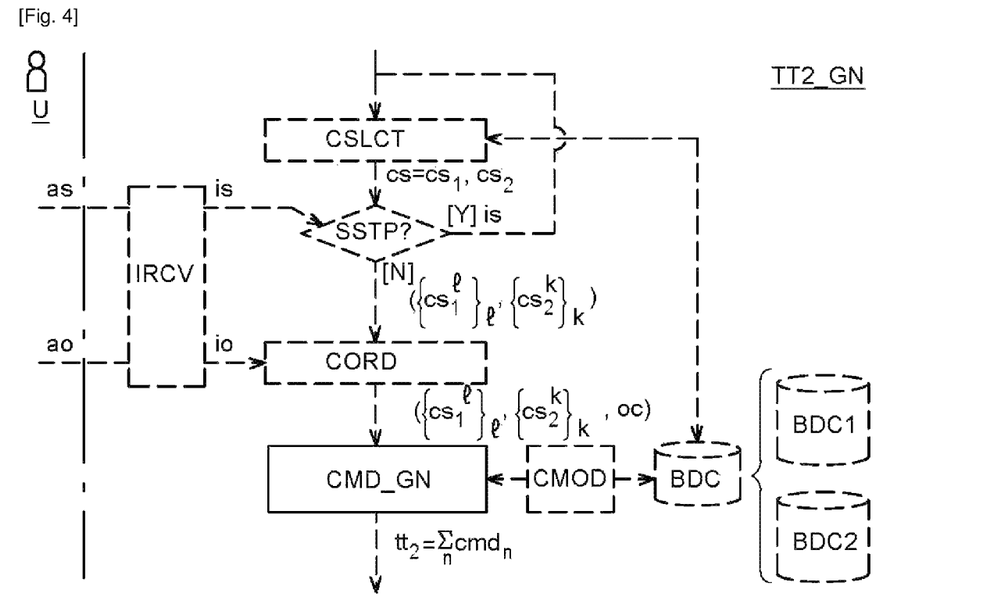
FIG. 4 shows a simplified diagram of a method for generating second processing operations according to the invention.

FIG. 4 illustrates a simplified diagram of a method for generating second processing operations according to the invention.

The method for generating a second processing operation providing second services, the second processing operation tt2 comprising at least one command cmd for an electronic device, the command cmd triggering an action from the electronic device from among the following actions:
  execution of a step of a method for a first processing operation providing a first service,
  control of the electronic device,
  the generation of second processing operations TT2_GN comprising the generation of commands CMD_GN as a function of multiple first cards $\{cs_1^T\}_I$ and of multiple second cards $\{cs_2^k\}_k$ selected independently from among a set of first cards $\{c_1^i\}_i$ and a set of second cards $\{c_2^j\}_j$, respectively, each first card being associated with a logic connector able to be executed during the execution of a second processing operation and each second card being associated with one element from among the following elements: a first service and an electronic device connected to a controller able to implement the second processing operation tt2.

In particular, the generation of second processing operations TT2_GN comprises multiple selections CSLCT of first cards from among the set of first cards and, independently of the selections of first cards, multiple selections of second cards from among the set of second cards, a selection CSLCT being a function of at least one selection instruction is.

In particular, the selection CSLCT selects the first and second cards from a storage device, such as a card base BDC, or even a first card base BDC1 and a second card base BDC2, respectively.

In particular, the generation of second processing operations TT2_GN comprises scheduling CORD of the selected first cards and second cards as a function of at least one scheduling instruction io.

In particular, the instruction i, in particular the selection instruction is or, where applicable, the scheduling instruction io, is a function of an action a from a user U, in particular a selection action a or a scheduling action ao, respectively.

In particular, the generating method TT2_GN comprises receiving IRCV a user action as, ao providing a selection instruction is or a scheduling instruction io, respectively.

In particular, the generating method TT2_GN comprises displaying, by means of a user interface, a first region for displaying a portion of the independently selected first cards and second cards and a second region for displaying the rest of the independently selected first cards and second cards, the first display region being associated with a trigger and the second display region with a controller activated by the trigger.

In particular, the user U performs an action as of selecting a first card received IRCV via the generation of second processing operations TT2_GN. The reception IRCV transmits the selection instruction is to the selection CSLCT which provides at least one card $cs=cs_1$, $cs_2$ as selected as a function of the selection instruction is.

Following this selection CSLCT, the generation of second processing operations TT2_GN verifies SSTP? if the reception IRCV has received a new selection action as from the user U providing a new selection instruction is. If the verification SSTP? detects a new selection instruction is then [Y] the verification SSTP? transmits the new selection instruction is to the selection CSLCT. Otherwise [N], the verification SSTP? sends command generation CMD_GN all of cards $\{cs_1^T\}_I$, $\{cs_2^k\}_k$ selected by the selection CSLCT.

In particular, when the user U schedules the selected cards ao, the reception IRCV supplies a scheduling instruction io as a function of their positions to a card scheduling CORD which supplies the order of the cards oc to the command generation CMD_GN.

The command generator CMD_GN calculates and generates, as a function of the selected cards $\{cs_1^T\}_I$, $\{cs_2^k\}_k$ and potentially their order oc, at least one command cmd, or a series of commands $\Sigma_n cmd_n$ constituting the second processing operation tt2.

In particular, the generation of second processing operations TT2_GN comprises the modeling of cards CMOD as a function of the generated second processing operation tt2. The one or more cards modeled from the generated second processing operation tt2 are potentially stored, for example, in a card base BDC, in particular a second card base BDC2.

One particular embodiment of the method for generating second processing operations is a program comprising program code instructions for executing the steps of the method for generating second processing operations when said program is executed by a processor.

Figure 5:
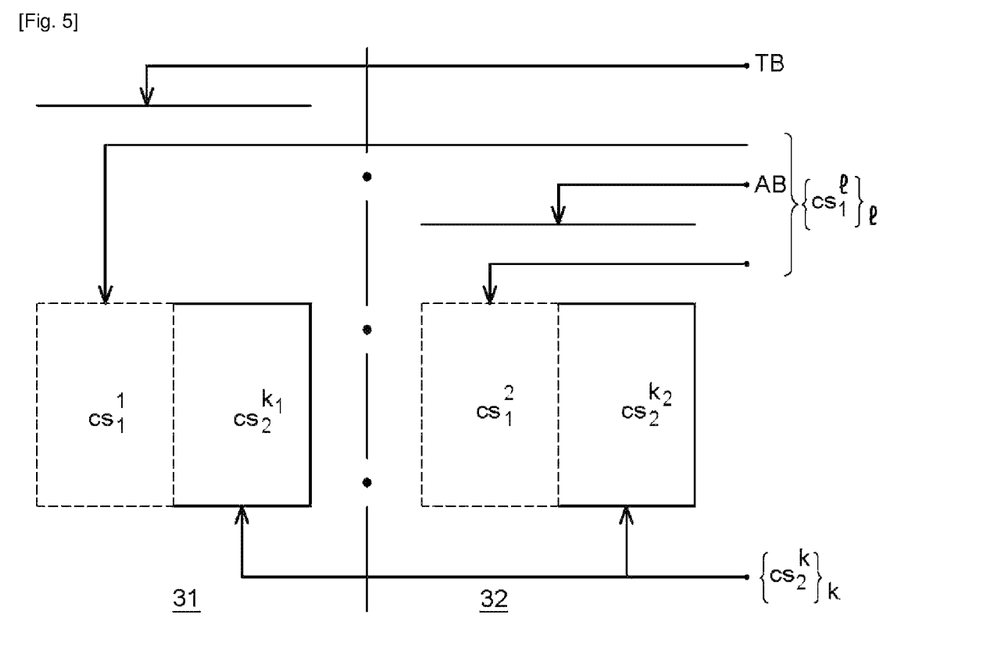
FIG. 5 shows a simplified diagram of a user interface for a generator of second processing operations according to the invention, the user interface comprising a first display region and a second display region.

FIG. 5 illustrates a simplified diagram of a user interface for a generator of second processing operations according to the invention, the user interface comprising a first display region and a second display region.

In the case where the user U selects four cards: two first cards and two second cards, and arranges them in two regions: a first region 31 and a second region 32. The first region makes it possible to form a block TB of triggering cards, and the second region makes it possible to form a block AB of action cards.

For example, the cards are arranged in a row. Potentially, other rows of cards may be arranged by the user U to define a second, more complex processing operation (i.e. one comprising multiple conditions and/or multiple actions).

Potentially, the first cards and second cards have a dedicated location where they may be placed by the user U. For example, the first cards are placed in first card regions and/or the first cards associated with a condition connector are placed in the first region or condition region 31 and/or the first cards associated with an action connector are placed in the second region or action region 32 and/or the second cards are placed in the second card regions (where applicable, in the first and the second region).

In the example of FIG. 5, the selected first card $cs_1^1$ corresponds, for example, to a condition connector such as "IF" and is placed in the first position in the row in the first display region to form the condition block TB. The selected second card $cs_2^{k1}$ corresponds, for example, to a first service or a connected thing and is placed in the second position in the row in the first display region to form the condition block TB.

Thus, the second processing operation tt2 thus generated will verify a condition relating to the first service or to the connected thing associated with the selected second card $cs_2^{k1}$ of the condition block TB during the execution thereof.

Another selected first card $cs_1^2$ corresponds, for example, to an action connector such as "THEN" and is placed in third position in the row in the second display region to form the action block AB. Another selected second card $cs_2^{k2}$ corresponds, for example, to a first service or a connected thing, which might or might not be distinct from the first service or connected thing of the condition block TB, and is placed in the fourth position in the row in the second display region to form the action block AB.

Thus if the condition is verified, the second processing operation tt2 thus generated will trigger the control for the action provided by the other selected second card $cs_2^{k2}$.

Figure 6:
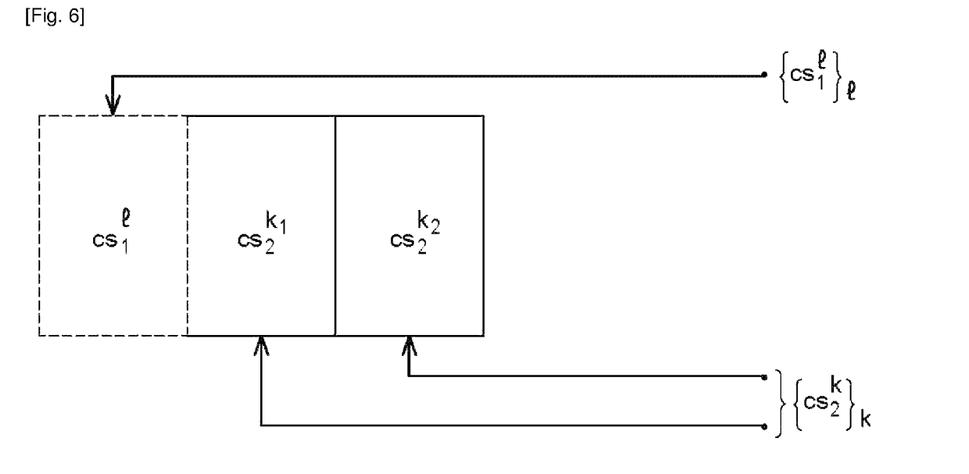
FIG. 6 shows a simplified diagram of a user interface for a generator of second processing operations in which a second card is added.

FIG. 6 illustrates a simplified diagram of a user interface for a generator of second processing operations in which a second card is added.

Additional second cards may be added by the user U to the basic arrangement provided by FIG. 5. This addition may be made before, after or between other cards already arranged in the row. FIG. 6 illustrates addition before or after cards that have already been arranged.

When a second card is added by the user U to a row and in a block already comprising a second card, the command generation creates an "AND" operator between the new second card and the one or more second cards already positioned in the block TB, AB.

Thus, all of the conditions generated from the second cards of the condition block TB are linked by the "AND" operator and have to be validated in the condition block in order to trigger the execution of the action block AB. For example, in the case where the condition block comprises a first card associated with the logic connector "IF" and second cards associated with a temperature>30°, with an open window position and with a time of 21:00, respectively, the implementation of the second processing operation leads to the interrogation of a connected thermometer, of the window and of the clock to check whether all of the conditions are true and, if so, trigger the block action AB.

Thus, all of the actions generated from the second cards of the action block AB are linked by the "AND" operator and will be executed either successively or simultaneously regardless of whether one of the actions does not end or completes at another time. For example, in the case where the block condition comprises a first card associated with the logic connector "THEN" and second cards associated with an SMS, and with an automatic watering system, respectively, if the condition is validated by the implementation of the second processing operation, it triggers both a command for a communication terminal to send the SMS and a command to activate the automatic watering system.

Figure 7A:
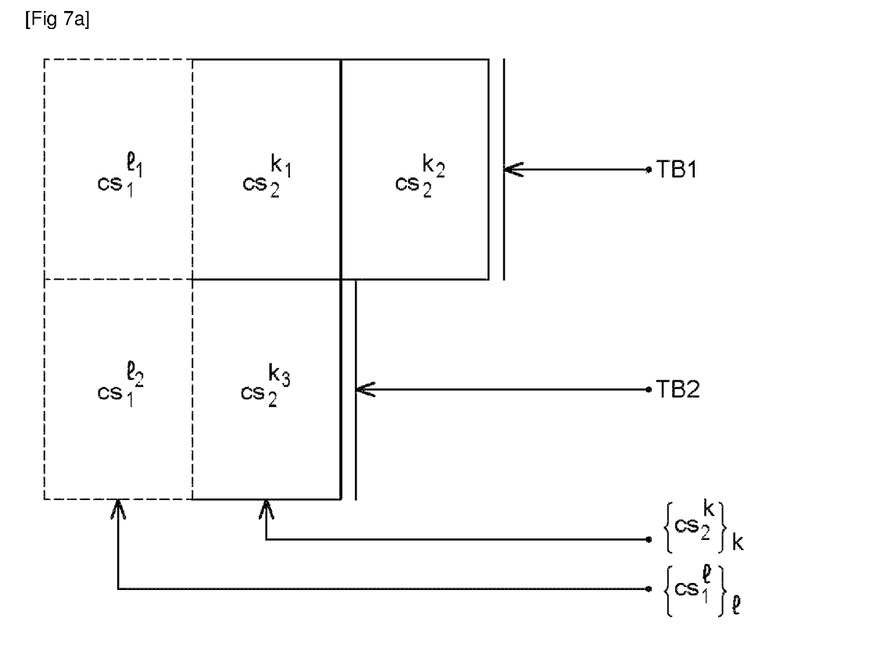
FIG. 7a shows a simplified diagram of a user interface for a generator of second processing operations in which a first card and at least one second card are added in the first region illustrated by FIG. 5.

FIG. 7a illustrates a simplified diagram of a user interface for a generator of second processing operations in which a first card and at least one second card are added to the first region illustrated by FIG. 5.

The user U may create or modify a new condition sub-block TB2 in addition to the condition sub-block TB1 ($cs_1^{T1}$, $cs_2^{k1}$, $cs_2^{k2}$). In particular, the user begins a new row or a new sub-block TB2 with a first card $cs_1^{T2}$, such as a first card connected to the logic connector "OR IF". The user adds a second card $cs_2^{k3}$ to this first card $cs_1^{T2}$.

If the new row is a new condition block TB2 independent of the preceding or following condition blocks TB1 which may be tested with a view to executing the action block AB. In other words, in the example above, the generation of the second processing operation will execute the actions only if all of the conditions of the first row TB1 are tested and validated or if all of the conditions of the additional row TB2 are tested and validated.

The user may add as many condition rows as desired.

Figure 7B:
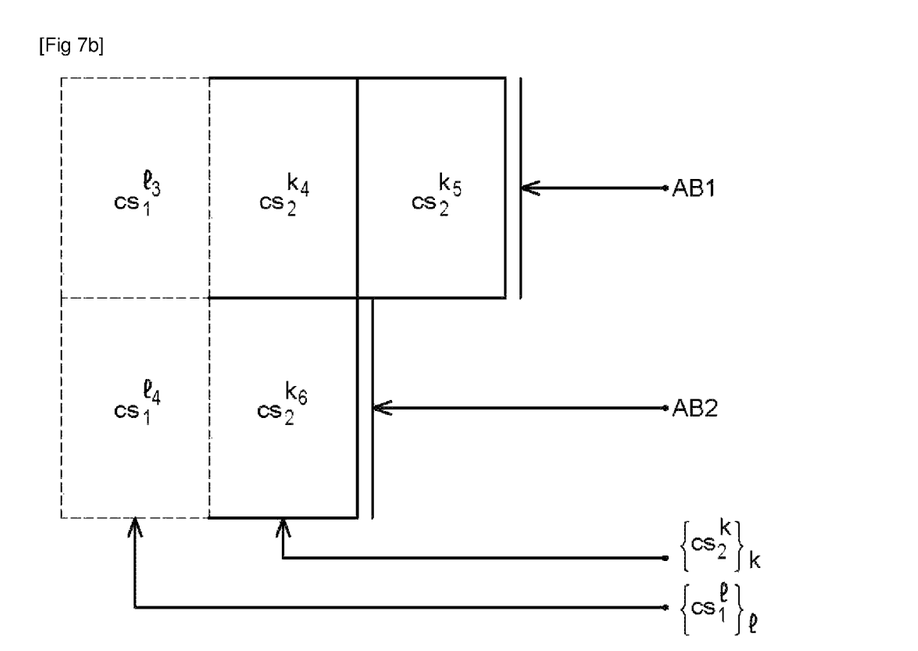
FIG. 7b shows a simplified diagram of a user interface for a generator of second processing operations in which a first card and at least one second card are added in the second region illustrated by FIG. 5.

FIG. 7b illustrates a simplified diagram of a user interface for a generator of second processing operations in which a first card and at least one second card are added to the second region illustrated by FIG. 5.

The user U may create or modify a new action sub-block AB2 in addition to the action sub-block AB1 ($cs_1^{T3}$, $cs_2^{k4}$, $cs_2^{k5}$). In particular, the user begins a new row or a new sub-block AB2 with a first card $cs_1^{T4}$, such as a first card connected to the logic connector "THEN AFTER". The user adds a second card $cs_2^{k6}$ to this first card $cs_1^{T4}$.

A row started with the "THEN" or "THEN AFTER" operator begins a new action block AB2 which will be executed after the preceding action block AB1. In other words, in the example above, the generation of the second processing operation will execute an action sub-block AB2 only if the execution of the preceding action block AB1 has already been launched, regardless of the result of this execution.

The user may add as many action rows as desired.

Figure 8:
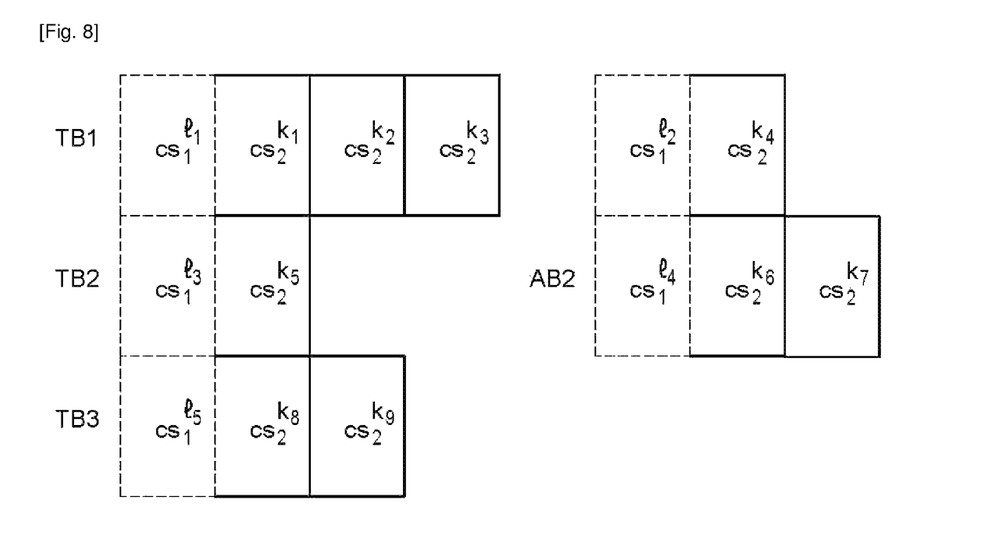
FIG. 8 shows a simplified diagram of a user interface for a generator of second processing operations according to the invention in the case of a "complex" second processing operation.

FIG. 8 illustrates a simplified diagram of a user interface for a generator of second processing operations according to the invention in the case of a "complex" second processing operation.

If the user selects cards like in the example of FIG. 8 to generate a complex second processing operation, the generation of the second processing operation will generate commands in the following order:

the first sub-block or condition block TB1 comprises a first card $cs_1^{T1}$ and three second cards $cs_2^{k1}$, $cs_2^{k2}$, $cs_2^{k3}$, the generation of second processing operations generates a condition command in which three conditions associated with the three second cards $cs_2^{k1}$, $cs_2^{k2}$, $cs_2^{k3}$ have to be tested. If the execution of the command generated from the first condition block TB1 allows all of the conditions to be validated, then the command generated from the first action block AB1 comprising the second card $cs_2^{k4}$ is executed. Otherwise, the condition command generated from the second condition block TB2 is tested.

the second sub-block or condition block TB2 comprises a first card $cs_1^{j3}$ and a second card $cs_2^{k5}$, the generation of second processing operations generates a condition command in which the condition associated with the second card $cs_2^{k5}$ has to be tested. If the execution of the command generated from the second condition block TB2 allows this condition to be validated, then the command generated from the first action block AB1 comprising the second card $cs_2^{k4}$ is executed. Otherwise, the condition command generated from the third condition block TB3 is tested.

the third sub-block or condition block TB3 comprises a first card $cs_1^{j5}$ and two second cards $cs_2^{k8}$, $cs_2^{k\mu9}$, the generation of second processing operations generates a condition command in which two conditions associated with the three second cards $cs_2^{k8}$, $cs_2^{k9}$ have to be tested. Otherwise, the commands generated from the action blocks AB1, AB2 are not executed.

If the command generated from the first action block AB1 is executed, then the one or more commands generated from the second action block AB2 comprising the two second cards $cs_2^{k6}$, $cs_2^{k7}$ is executed after the execution of the command generated from the first action block AB1. Thus, the commands generated from the first action block AB1 can be executed even if the commands generated from the second action block aB2 cannot be but the commands generated from the second action block aB2 cannot be executed if the commands generated from the first action block AB1 cannot be.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

The invention claimed is:

1. A generator of second processing operations providing second services, each second processing operation comprising at least one command for an electronic device, the command triggering an action from the electronic device from among the following actions:
   execution of a step of a method for a first processing operation providing a first service,
   control of the electronic device,
   the generator of second processing operations comprising:
   a processor; and
   a non-transitory computer readable medium comprising program code instructions stored thereon which when executed by the processor configure the generator to:
   generate commands as a function of multiple first cards and of multiple second cards selected independently from among a set of first cards and a set of second cards, respectively, each first card being associated with a logic connector able to be executed during execution of at least one of the second processing operations, and each second card being associated with one element from among the following elements: the first service and the electronic device connected to a controller able to implement the second processing operation, the generator generating at least one command as a function of an order in which the selected first cards and second cards are positioned.

2. The generator of second processing operations according to claim 1, the generator of second processing operations comprising a user interface, the user interface being configured to display the set of first cards and the set of second cards, and being configured to receive an instruction for selecting first cards and second cards as a function of an action from a user.

3. The generator of second processing operations according to claim 2, in which the user interface is able to receive a command for scheduling the selected first cards and second cards.

4. The generator of second processing operations according to claim 2, in which the user interface comprises at least one first region for displaying a portion of the selected first cards and second cards and a second region for displaying the rest of the selected first cards and second cards, the first display region being associated with a trigger and the second display region with a controller activated by the trigger.

5. The generator of second processing operations according to claim 1, in which the first cards and second cards are virtual cards available in a card base.

6. The generator of second processing operations according to claim 1, in which:
   the first cards and second cards are physical cards;
   the generator of second processing operations is connected to an identifier of the selected first and second cards.

7. The generator of second processing operations according to claim 6, the generator of second processing operations comprising a position analyzer for analyzing the position of the physical cards which is connected to a card sensor, the analyzer being able to provide the order of the selected first cards and second cards.

8. A service provision device comprising:
   a processing operation base stored on a first non-transitory computer readable medium and comprising at least first processing operations;
   a first processor able to implement at least one of the first processing operations;
   a generator of second processing operations providing second services, the second processing operation comprising at least one command for an electronic device, the command triggering an action from the electronic device from among the following actions:
   execution of a step of a method for a first processing operation providing a first service, control of the electronic device, the generator of second processing operations comprising:
- a second processor; and
- a second non-transitory computer readable medium comprising program code instructions stored thereon which when executed by the processor configure the generator to:
- generate commands as a function of multiple first cards and of multiple second cards selected independently from among a set of first cards and a set of second cards, respectively, each first card being associated with a logic connector able to be executed during execution of at least one of the second processing operations, and each second card being associated with one element from among the following elements: the first service and the electronic device connected to a controller able to implement the second processing operation, the generated second processing operation being able to be implemented by the first processor, the generator generating at least one command as a function of an order in which the selected first cards and second cards are positioned.

9. The service provision device according to claim 8, the service provision device comprising a recorder configured to store the generated second processing operation in the processing operation base.

10. A method for generating a second processing operation providing second services, the second processing operation comprising at least one command for an electronic device, the command triggering an action from the electronic device from among the following actions:
- execution of a step of a method for a first processing operation providing a first service,
- control of the electronic device,
- the generating of the second processing operation being implemented by a command generation device and comprising:
  - generating commands as a function of multiple first cards and of multiple second cards selected independently from among a set of first cards and a set of second cards, respectively, each first card being associated with a logic connector able to be executed during execution of the second processing operation and each second card being associated with one element from among the following elements: the first service and the electronic device connected to a controller able to implement the second processing operation, the command generation device generating at least one command as a function of an order in which the selected first cards and second cards are positioned.

11. The method for generating a second processing operation according to claim 10, in which the generation of second processing operations comprises multiple selections of first cards from among the set of first cards and, independently of the selections of first cards, multiple selections of second cards from among the set of second cards, at least one of the selections being a function of at least one selection instruction.

12. The method for generating a second processing operation according to claim 11, in which the instruction is a function of an action from a user.

13. The method for generating a second processing operation according to claim 10, in which the generation of second processing operations comprises scheduling of the selected first cards and second cards as a function of at least one scheduling instruction.

14. The method for generating a second processing operation according to claim 13, in which the instruction is a function of an action from a user.

15. The method for generating a second processing operation according to claim 10, in which the generating method comprises displaying, by using a user interface, a first region for displaying a portion of the independently selected first cards and second cards and a second region for displaying the rest of the independently selected first cards and second cards, the first display region being associated with a trigger and the second display region with a controller activated by the trigger.

* * * * *